(12) United States Patent
Ghenn

(10) Patent No.: US 10,304,268 B1
(45) Date of Patent: May 28, 2019

(54) VISITOR CREDENTIALING SYSTEM FOR AN ACCESS-CONTROLLED ENVIRONMENT

(71) Applicant: REPIFI Vendor Logistics, Inc., Denver, CO (US)

(72) Inventor: Jonathan Ghenn, Denver, CO (US)

(73) Assignee: REPIFI VENDOR LOGISTICS, INC., Denver, CO (US)

( * ) Notice: Subject to any disclaimer, the term of this patent is extended or adjusted under 35 U.S.C. 154(b) by 0 days.

(21) Appl. No.: 16/123,418

(22) Filed: Sep. 6, 2018

(51) Int. Cl.
*G07C 9/00* (2006.01)
*H04W 4/021* (2018.01)

(52) U.S. Cl.
CPC ...... *G07C 9/00103* (2013.01); *G07C 9/00111* (2013.01); *G07C 9/00119* (2013.01); *H04W 4/021* (2013.01)

(58) Field of Classification Search
None
See application file for complete search history.

(56) References Cited

U.S. PATENT DOCUMENTS

| | | | |
|---|---|---|---|
| 5,960,085 A | 9/1999 | Huerga | |
| 8,629,755 B2 | 1/2014 | Hashim-Waris | |
| 2015/0122893 A1* | 5/2015 | Warther | G06K 7/10366 235/492 |
| 2016/0183653 A1* | 6/2016 | Warther | G06K 19/07726 340/10.51 |

FOREIGN PATENT DOCUMENTS

| | | |
|---|---|---|
| CN | 206119397 U | 4/2017 |
| WO | WO 2016/164214 | 10/2016 |

OTHER PUBLICATIONS

English abstract of CN206119397U.

* cited by examiner

*Primary Examiner* — Joshua L Schwartz
(74) *Attorney, Agent, or Firm* — Caesar Rivise, PC

(57) ABSTRACT

A method for credentialing visitors to an access-controlled environment includes providing a smart-phone based credentialing platform, providing an electronic badge having electronically controlled indicia thereon, enrolling a visitor by entering visitor information based on requirements of an administrator, approving the requirements of the step of enrolling are met, requesting, by a visitor, a location for which access is desired, and approving the request. The method further includes the steps of checking in on the smart-phone to establish check-in data, communicating between the smart-phone and the badge indicia data for forming a display image on the display of the badge, recording geo-location data of the visitor, checking out of the system, recording check-in data and check-out data and removing the indicia from the badge display.

20 Claims, 8 Drawing Sheets

VISITOR CREDENTIALING SYSTEM FOR AN ACCESS-CONTROLLED ENVIRONMENT

BACKGROUND OF THE INVENTION

The present invention relates to personal identification badges and visitor access control to facilities. More particularly, the present invention related to personal identification badges and visitor access control to facilities for visitors requiring temporary access to such facilities.

It is a common practice to issue identification badges to employees at facilities such as hospital or other healthcare facilities, office buildings, factories and the like. In the past, temporary badges, typically in the form of printed paper badges were used, wherein the badges were obtained either at a manned station at the building entrance or via an unmanned kiosk at the building entrance that provides a badge after relevant information is input. The badges often are imprinted with a photograph and the name of the visitor and are typically worn by the visitor so as to be visible by others.

If a manned station is used, a visitor is typically received and processed by a receptionist that greets the visitors and provides him or her with a temporary badge. The receptionist typically queries the visitor about the purpose of their visit, examines and validates the visitor's credentials to establish identity and other required documents for entry, establishes the visitor's status and decides to allow or disallow the visit.

Such healthcare facilities often require contractors, temporary staff, volunteers, and other to require access to the facilities at certain times. Some may require facility access for only one day while others may work at the facility for one or more weeks. In the past, when such workers finished a job, the badge is surrendered or the badge is dated, so that the person no longer may access the facility.

It would be beneficial to have a badge and visitor access system that is smart phone application based, where any documentation required for the visit is entered through the smart phone application (and periodically updated if necessary) at an initial system enrollment, and where more limited information is required prior to a visit to the facility, such that no receptionist performing such functions is required.

It would also be beneficial to provide a badge and visitor access system where there is no requirement for physical hardware to be present at the facility. Therefore, local Wi-Fi connection issues are minimized, and hardware issues such as faulty badge printers and keyboards are also minimized.

Finally, it would be beneficial to have all visitors pre-badged and pre-approved prior to entry at the facility.

All references cited herein are incorporated herein by reference in their entireties.

BRIEF SUMMARY OF THE INVENTION

The present invention is directed to a method for credentialing visitors to an access-controlled environment by an access administrator. The method first includes the steps of providing a smart-phone based credentialing platform having global positioning system (GPS) capability and providing an electronic badge having a display having electronically controlled and changeable indicia thereon, the badge adapted communicate with a smart-phone. Next, the method continues with the steps of enrolling a visitor into the credentialing platform by entering visitor information based on requirements of the administrator; approving, by the administrator, that the requirements of the step of enrolling are met; requesting, by the visitor, at least one location for which access is desired and submitting the at least one location to the administrator via the credentialing platform the location having a pre-defined area; and approving, by the administrator, the request for access at the at least one location. The method continues with the steps of checking in on the smart-phone, by the visitor via the credentialing platform to establish check-in data including check-in time and date by the visitor, wherein the check-in data is recorded by the credentialing platform. The smart phone then communicates indicia data to the electronic badge for forming a display image on the display on the electronic badge. The badge display displays indicia showing access by the visitor is authorized to the location. The credentialing platform records geo-location data of the visitor during the visitor's presence in the pre-defined area. When the visitor departs the pre-defined area of the location, a step of checking-out establishes check-out data, including check-out time and date and geo-location. The credentialing platform records the check-in data, the geo-location data and the check-out data of the visitor. Finally, the indicia showing that access by the visitor is authorized is removed from the badge display.

Steps of requesting, by the visitor, a specific time interval for visiting the at least one location, and approving, by the administrator, the request for the specific time interval may be included.

A step of providing an electronic identifier by the administrator to allow for access by the visitor to the at least one location at the specific time interval may be provided, wherein the step of checking in on the smart-phone includes using the electronic identifier via the credentialing platform during the specific time interval, to establish the check-in data.

The step of checking out of the system may include detecting when the visitor departs the pre-defined area utilizing the visitor's geo-location. The step of checking out of the system may include manually checking out by the visitor on the smart-phone using the credentialing platform. The step of enrolling a visitor into the credentialing platform by entering visitor information based on requirements of the administrator may include opening a smart phone application of the credentialing platform on the smart phone; opening a credentialing platform account by selecting a visitor username and password or biometric, and providing personal information required by the credentialing platform into the account. The step of enrolling a visitor into the credentialing platform by entering visitor information based on requirements of the administrator may further include executing documents and uploading the executed documents to the credentialing platform.

The step of communicating between the smart-phone and the electronic badge may include communicating wirelessly, for example, by near field communication (NFC). The step of approving, by the administrator, that the requirements of the step of enrolling are met, and the step of approving, by the administrator, the request for access at the at least one location, may include confirmation by a human that the requirements of the step of enrolling are met. The step of checking in by the visitor may be required to occur within a specified distance from the at least one location, for example, within one mile of the location. The step of checking out of the system may occur automatically by the credentialing platform after a pre-determined time period set by the administrator. The pre-determined time period may be eight hours. The step of requesting, by the visitor, at least one location for which access is desired may be automatically denied, by the credentialing platform upon the visitor reaching a predetermined number of visits to the at least one location. The step of approving, by the administrator, the request for the specific time interval may be automatically revoked upon reaching a predetermined amount of time after the step of requesting access by the visitor is made. The step of approving, by the administrator, the request for access at the at least one location may include approval by a human on the staff of the administrator. The step of approving, by the administrator, the request for access at the at least one location may include computerized approval without human contact. The step of displaying on the badge display indicia showing access by the visitor is authorized may include displaying a machine readable code, e.g., a bar code or a QR code, as are well known. Finally, the electronic badge may utilize a display using electronic paper display technology (e.g., E Ink®) with low or no power requirements.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

The invention will be illustrated in more detail with reference to the following embodiments, but it should be understood that the present invention is not deemed to be limited thereto.

Figure 1:
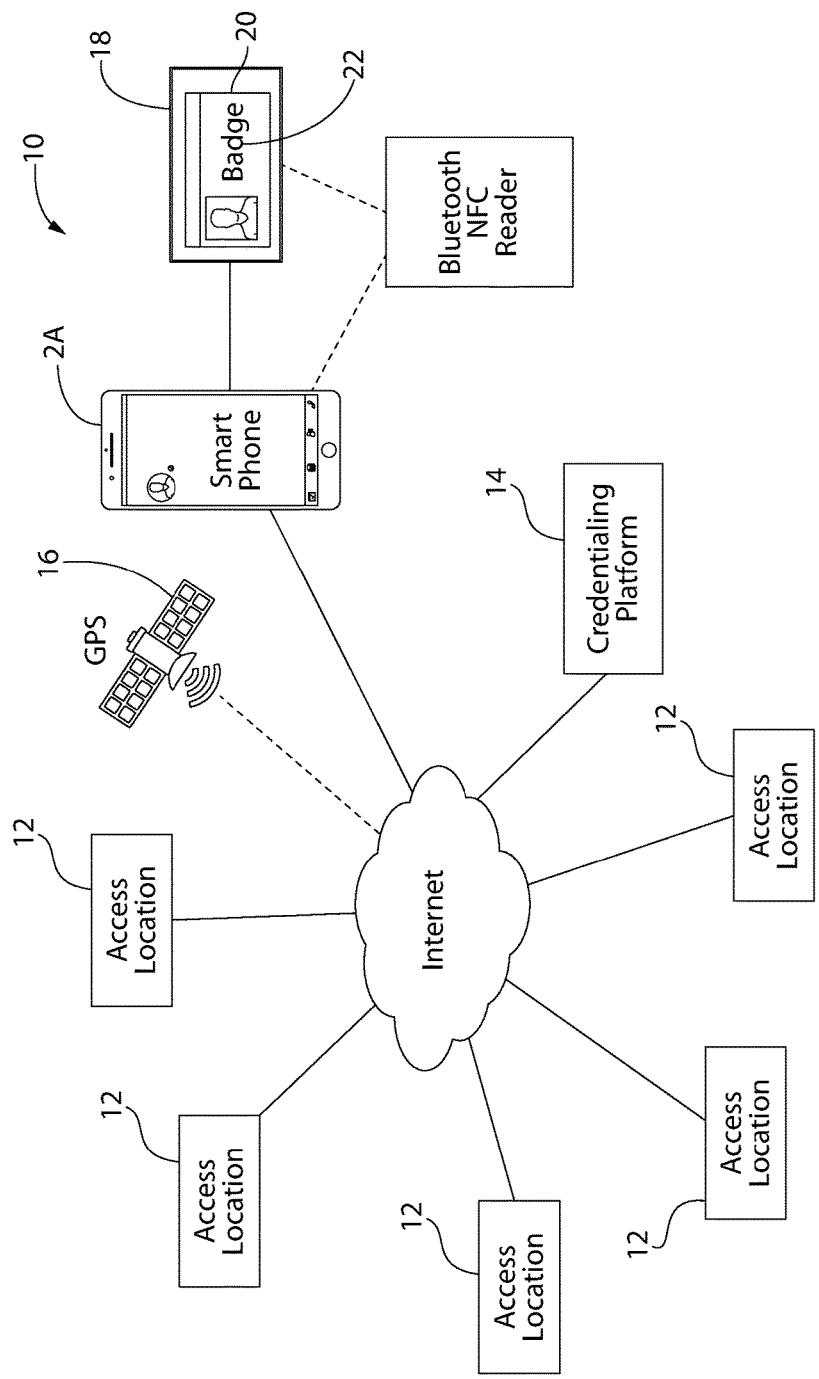
FIG. 1 is a block diagram of a method for credentialing visitors to an access-controlled environment by an access administrator in accordance with an exemplary embodiment of the present invention.

Referring now to the drawings, wherein like part numbers refer to like elements throughout the several views, there is shown in FIG. 1 a block diagram of an overall system 10 for which the present method for credentialing visitors to an access-controlled environment by an access administrator is utilized. The system 10 generally includes a plurality of access locations 12 under the umbrella of an administrator who desires access control. The administrator may be, for example, a hospital or healthcare provider having one or more locations or one or more points of access within its location. It is noted that the present invention is not intended to be limited to hospitals and healthcare facilities. It can be applied to substantially any building or facility where access control to visitors (including employees) is desired.

As can be seen in FIG. 1, the system 10 includes a smart-phone based credentialing platform 14 having global positioning system (GPS) capability 16. That is, the credentialing system 14 utilizes GPS functionality already present in substantially all smart phones.

Figure 2:
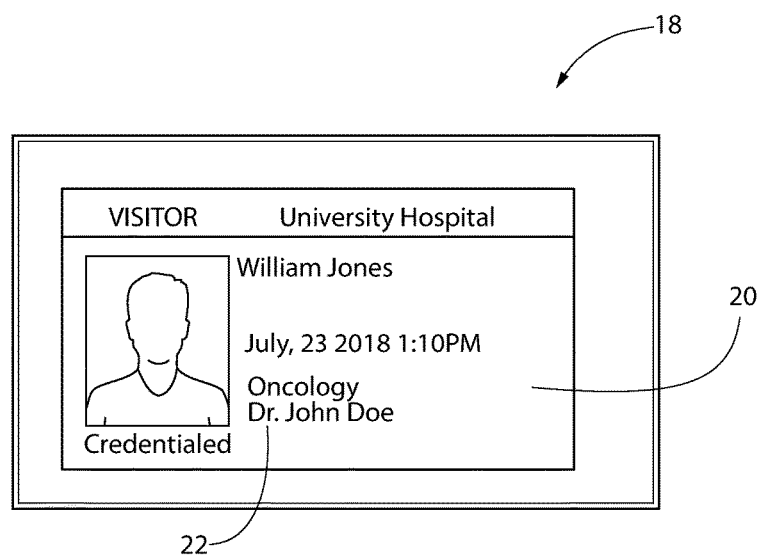
FIG. 2 is an exemplary electronic badge used in the method for credentialing visitors to an access-controlled environment by an access administrator of FIG. 1.

The system 10 further includes an electronic badge 18 having a display 20 having electronically controlled and changeable indicia 22 thereon. For more details of the electronic badge 18, see FIG. 2. The electronic badge 18 communicates with a smart-phones 24 operated by individual users.

The flowcharts of FIGS. 3A-3C and 4A-4B depict an exemplary embodiment of the method for credentialing visitors of the present invention. These flowcharts are merely a typical example and the precise steps shown are not necessarily deemed to be required for the present invention. Additionally, the sample "screenshots" of the smart phone 24 of FIGS. 5A-5H are again meant to be illustrative only, and the particular indicia shown is not meant to be limiting.

Figure 3A:
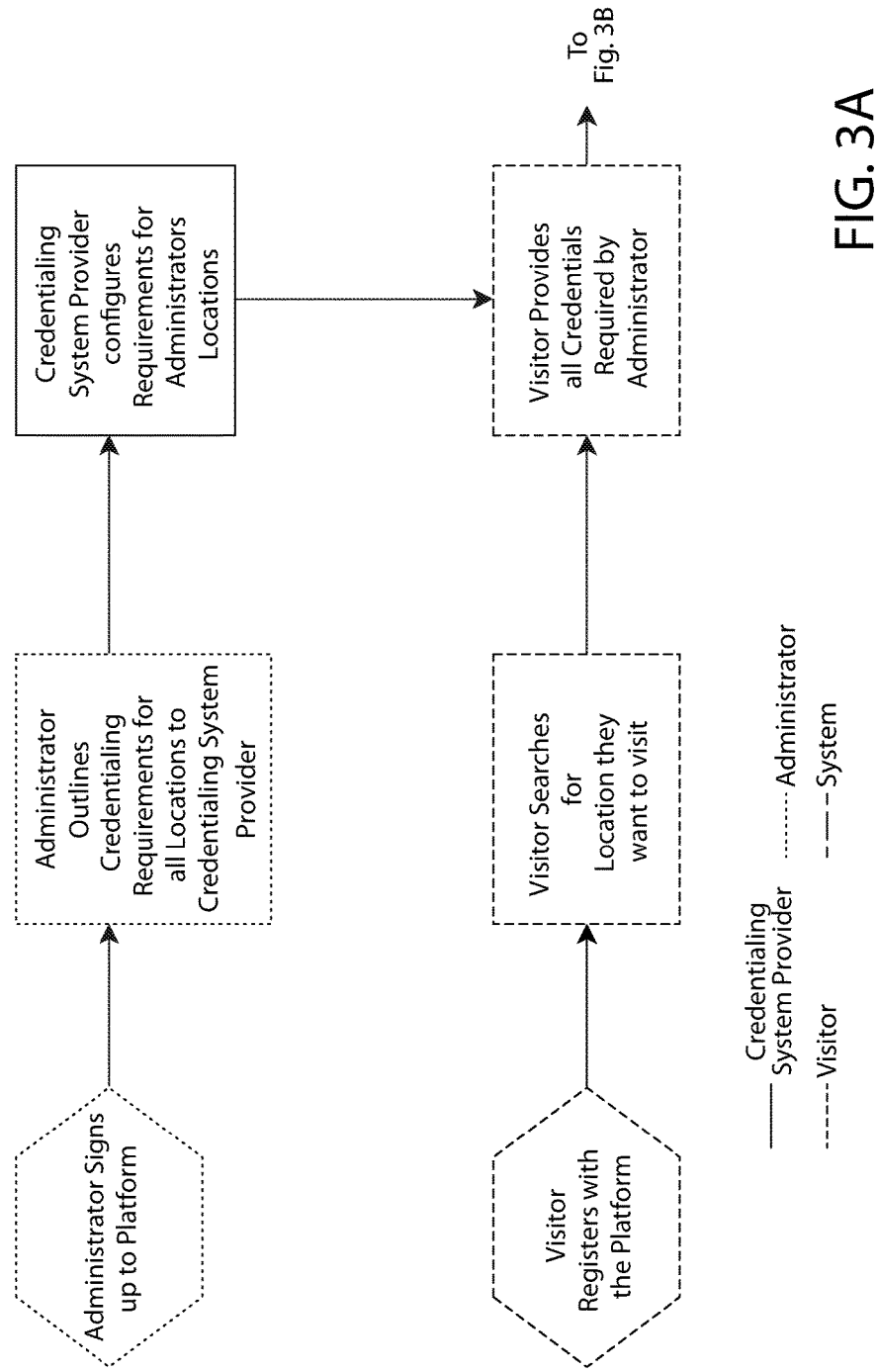
FIGS. 3A-3C is an exemplary flowchart of registration steps taken by a visitor utilizing the method for credentialing visitors to an access-controlled environment by an access administrator of FIG. 1.

Initially, as shown in the flowchart of FIG. 3A, the administrator registers the credentialing platform 14 and outlines all credentialing requirements for all access locations 12 for one or more administrator facilities. The credentialing requirements may include any relevant information whatsoever, including, for example, name, address, business affiliation, existence of desired executed forms; reason for visits, etc. A credentialing system provider of the credentialing platform 14 may configure the credentialing platform 14 for requirements with respect to the various access locations.

Figure 3B:
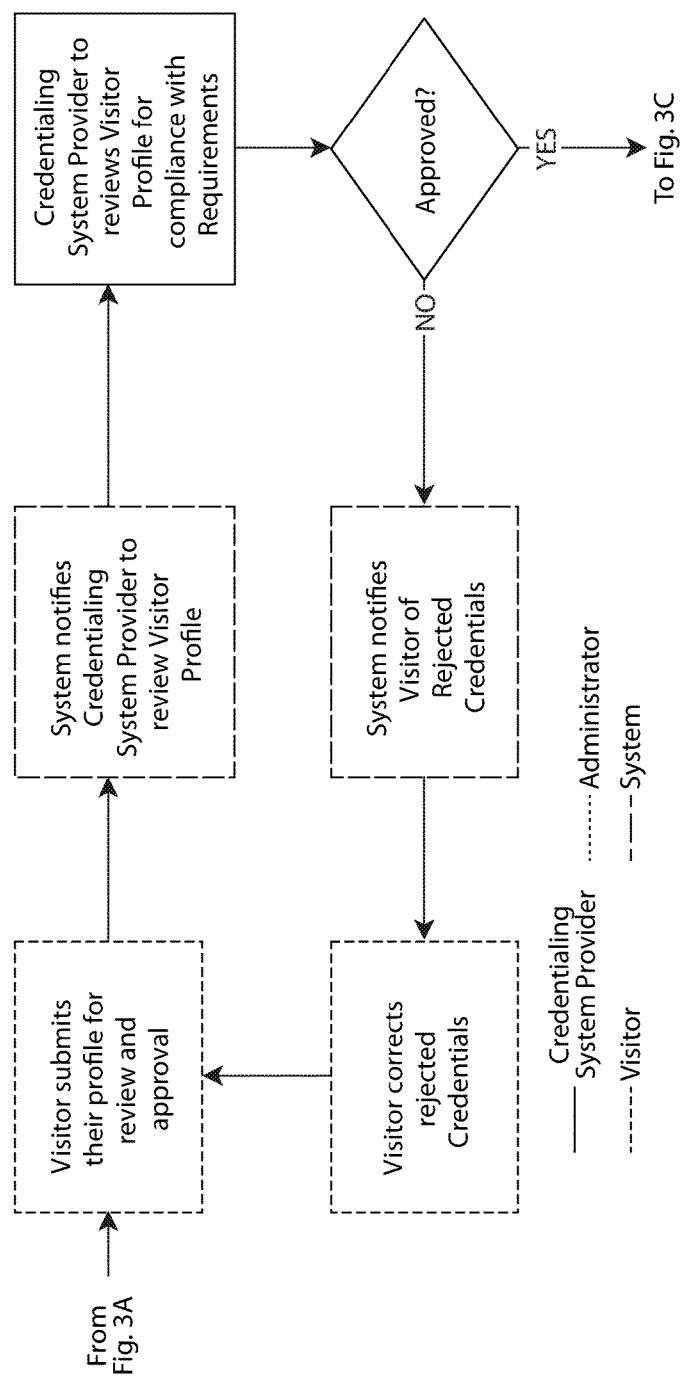
Figure 3C:
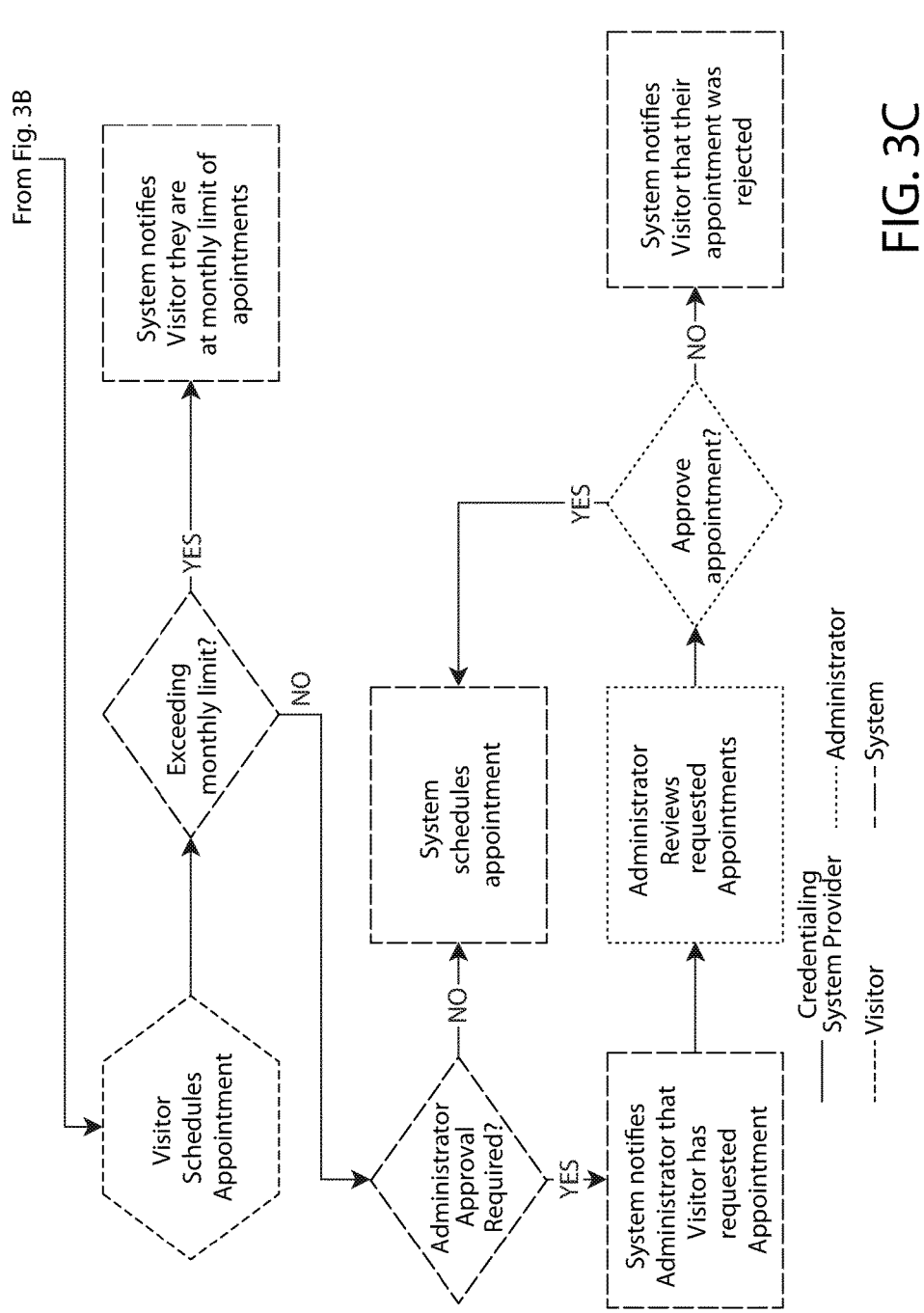
Figure 4A:
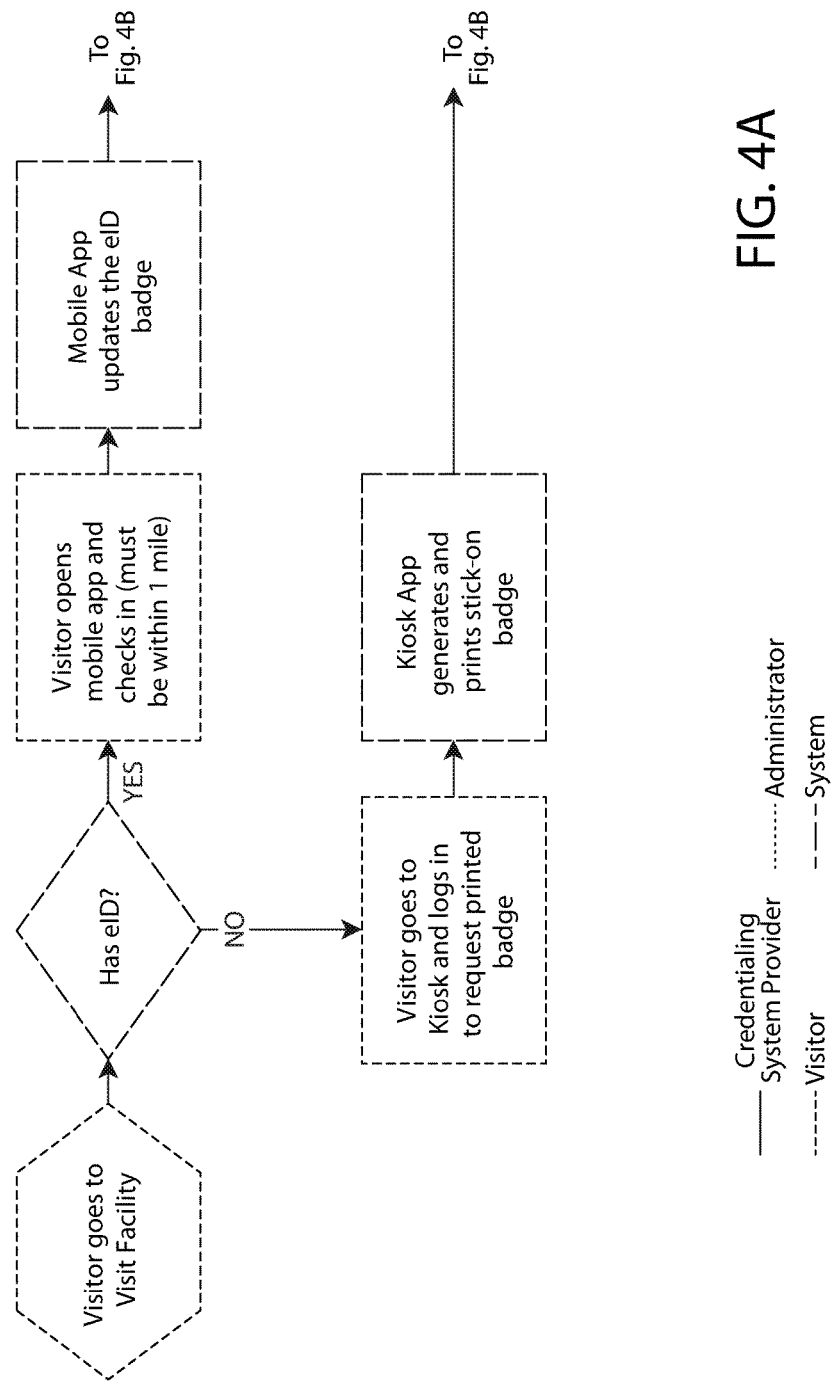
FIGS. 4A-4B is an exemplary flowchart of steps taken by a visitor prior to and during a visit to an administrator access location of the method for credentialing visitors to an access-controlled environment of FIG. 1.
Figure 4B:
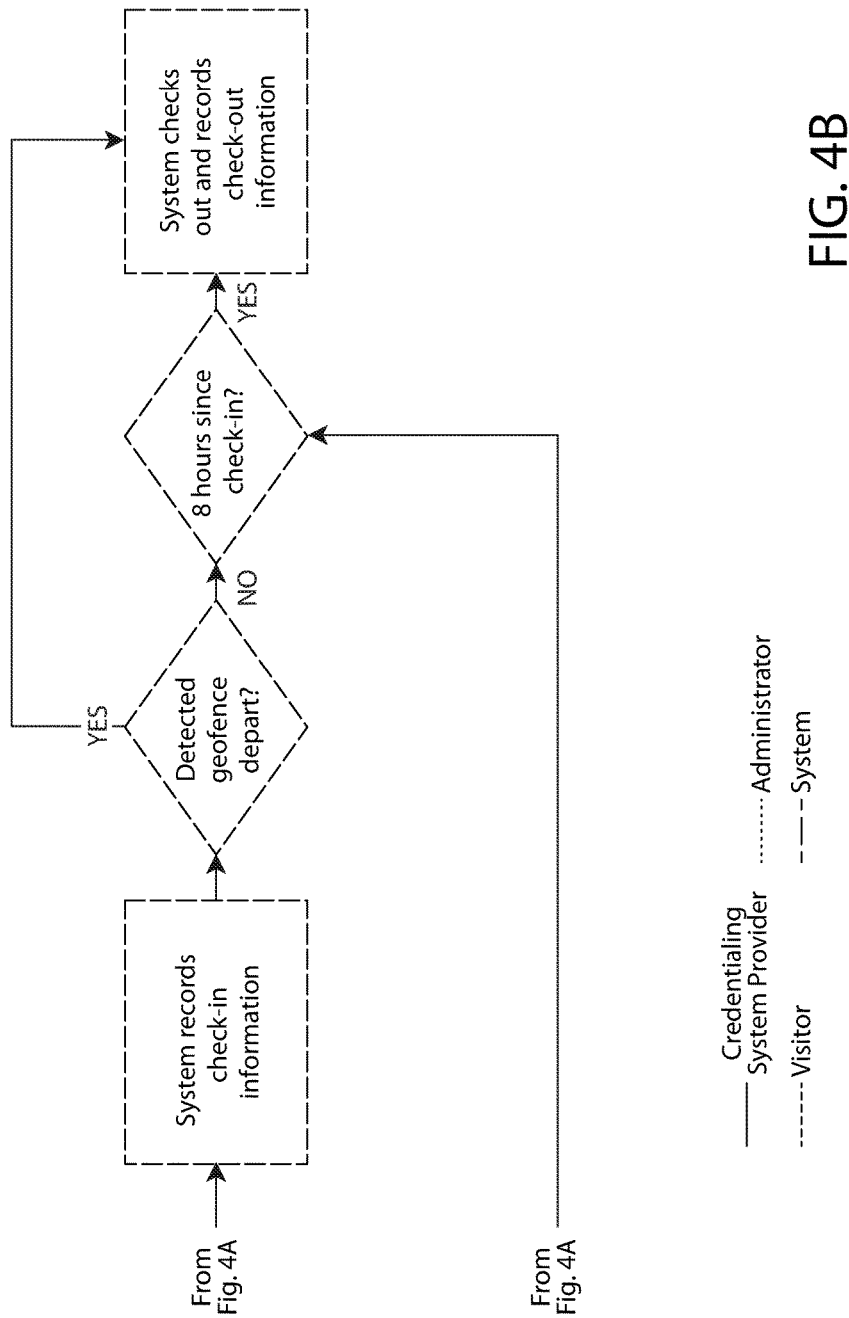
Figure 5A:
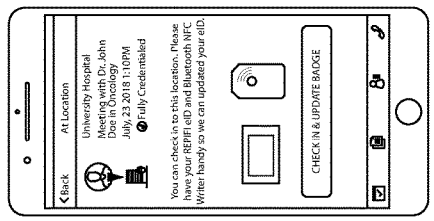
FIGS. 5A-5H are exemplary simplified smartphone screenshots of registering and checking in by a visitor at an access location of the method for credentialing visitors to an access-controlled environment of FIG. 1.
Figure 5E:
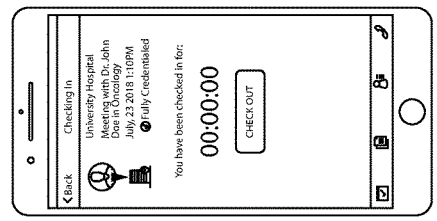
Figure 5B:
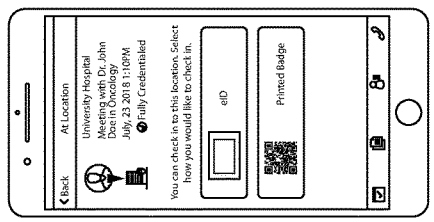
Figure 5F:
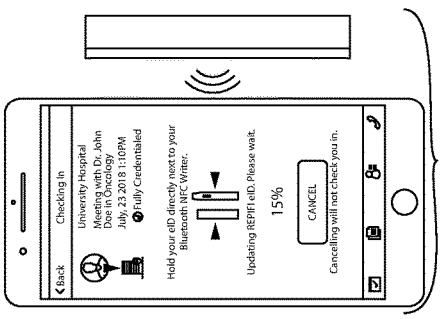
Figure 5C:
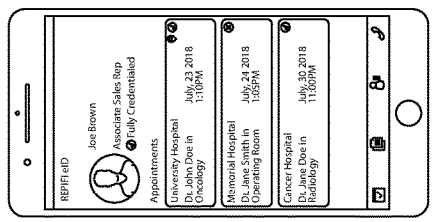
Figure 5G:
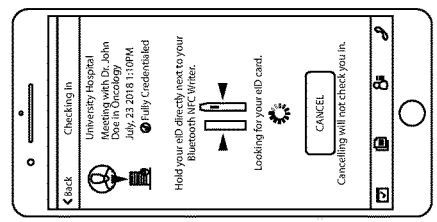
Figure 5D:
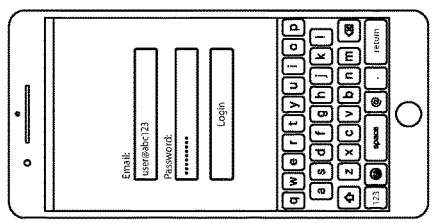
Figure 5H:
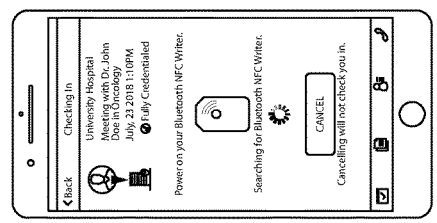

As shown in FIGS. 3A and 3B and, visitor enrolls/registers into the credentialing platform 14 by entering visitor information based on requirements of the administrator. The administrator, via the credentialing platform 14, approves or rejects the enrolling information provided by the visitor based on whether or not pre-determined requirements of the step of enrolling are met. This step of approving may include confirmation by a human at the administrator that the requirements of the step of enrolling are met. An automated approval system is also contemplated to be within the scope of the present invention wherein no human input is required. This step for enrolling may include opening a smart phone application of the credentialing platform on the smart phone—typically either Apple, Inc iOS based, or Android based. Here, typically, the visitor would select a username and password (or biometrics (finger print, facial scan, etc.) may be used in lieu of passwords, as are well-known). Enrolling may also include providing personal information required by the credentialing platform into the account. This personal information may also include a requirement for uploading executed documents, or on-line execution of documents, for example, a requirement for executed HIPAA forms.

Subsequent to enrolling into the credentialing platform 14, when the visitor desires to visit a facility for which he or she requires access authorization from the administrator, the visitor requests the administrator, via the credentialing platform 14 on his or her smart phone 24, to visit at least one facility having one or more access locations 12. See FIG. 3A and FIGS. 4A-4B. Each access location 12 has its own pre-defined area that was previously entered into the credentialing platform 14 by the administrator.

The administrator then approves or denies the request for access. The approval or denial may occur either automatically or may require human input by the administrator. The visitor also requests, via the credentialing platform 14, a specific time interval for visiting the at least one location. The administrator then approves or requests for the specific time interval. See FIGS. 3B and 4C. These requests for access and for a time interval and their approvals may occur in any order or simultaneously, and may occur automatically (by electronic analysis by the credentialing platform 14) or require human input by the administrator. The request by the visitor may be automatically denied by the credentialing platform upon the visitor reaching a predetermined number of visits to one or more access locations. See FIG. 3C.

If the requests for access and for a time interval are approved by the administrator, an electronic identifier is provided by the administrator, via the credentialing platform 14 to the smart phone 24, to allow for access by the visitor to the at least one access location 12 at the specific time interval (see FIG. 4C). The visitor then checks in on his or her smart phone 24 using the electronic identifier (which may or may not be blind to the visitor) via the credentialing platform 14 during the specific time interval. See FIG. 4D. The system may be set up such that the step of checking in by the visitor must occur within a specified distance from the at least one location, for example, one mile. Check in data (e.g., check in time, check in date, geo-location (i.e., location generated by the smart phone 24 GPS functionality) is generated and saved by the credentialing platform 14. The credentialing platform may record the check in data for the visitor.

The visitor then has his or her smart phone 24 communicate with the electronic badge 18 to send indicia data for forming a display image on the display 20 on the electronic badge 18. See FIG. 4A (optionally, the visitor may go to a kiosk and obtain a printed paper badge). This communication may occur via a wired connection or wirelessly via, for example, Bluetooth® technology, including near field communication (NFC) as described in further detail below. The display then displays indicia 22 including, for example, authorized access, a face image of the visitor, and the time interval for which the visitor has authorized access to the facility. The indicia 22 may also include machine readable code (e.g., a bar code or a QR code) for access points that require such a code. Preferably (but not a requirement) and as discussed below, the display utilizes electronic paper display technology (e.g., E Ink® technology) with low or no power requirements. All relevant data is recorded, by the credentialing platform 14, including geo-location data of the visitor during the visitor's presence in the pre-defined area. See FIGS. 4E-4H.

With respect to the wireless communication discussed above, as stated, near field communication (NFC), as is well known, may be used. Currently some smart phones, including iPhones® manufactured by Apple, Inc., do not have NFC write capability, while many or mort Android® based phones do have such capability. For smart phones lacking NFC write capability, a commercially available NFC reader/writer 26 may be used. One such reader currently available is the ACR1255U-J1 Secure Bluetooth® NFC reader by Advanced Card Systems, Ltd. of Hong Kong. If such a reader is used, the smart phone 24 lacking NFC capability communicates with the NFC reader/writer 26 which then communicates with the display badge 18. Currently available display badges may not be capable of communicating directly with smart phones lacking NFC write technology. Once full direct communication between smart phones and display badges is widely available, the NFC reader/writer will become unnecessary.

The display badge 18 may be, for example, a battery-less smart card made by Aioi Systems Co, Ltd. of Tokyo, Japan, model number SC1029L, having a black and white 2.9 inch e-Paper rewritable display that utilizes the ISO/IEC 18092 communication standard (212 kbps passive communication mode) and the RoHS environmental standard.

When the visitor departs from the facility, he or she is checked-out by the credentialing platform 14. This may occur automatically when the visitor departs the pre-defined area of the access location 12 and/or the visitor may log out manually via the smart phone application of the credentialing platform 14. Alternatively or additionally, visitor check out may occur automatically by the credentialing platform after a pre-determined time period (e.g., 8 hours) set by the administrator. Check-out data, including, for example, check-out time and date and geo-location is saved by the credentialing platform 14. As stated, the credentialing platform 14 may record all check-in and check-out information by the visitor. Once the visitor checks out, the indicia 22 showing access by the visitor is authorized is removed from the display 20 on the electronic badge 18.

The step of approving, by the administrator, the request for the specific time interval may be automatically revoked upon reaching a predetermined amount of time after the step of requesting access by the visitor is made, for example, 8 hours.

Administrators may have multiple locations or facilities, and each location or facility may have different requirements. Depending on the administrator's preference, a visitor may need to request approval for a scheduled visit, or if not, in some cases, it is contemplated that the visitor can create an appointment without approval by an administrator. However, a visitor that is not fully credentialed (i.e., a visitor that has not been property enrolled and accepted by an administrator can neither request nor create appointments).

It is also contemplated that the present invention may be used, at least in part, in conjunction with a kiosk that prints a badge on paper. Here, obviously, the full functionality of all of the steps discussed herein would not be present.

In the exemplary embodiments of the present invention claimed herein, the method for credentialing visitors to an access-controlled environment by an access administrator improves the operation of a computer device by providing in that the system allows for increased processing speed and efficiency due to, for example, a requirement to enter enrollment information only once, thereby not requiring subsequent review and analysis of enrollment information. Moreover, the electronic communication (via, for example, NFC) between the smart phone 24 and the electronic badge 18 improves processing speed and efficiency since separate logging in of data is not required. Finally, operation of the computer is improved in that printed data for each visit by a visitor, required by prior systems, is no longer required.

While the invention has been described in detail and with reference to specific embodiments described herein, it will be apparent to one skilled in the art that various changes and modifications can be made therein without departing from the spirit and scope thereof.

What is claimed is:

1. A method for credentialing visitors to an access-controlled environment by an access administrator, comprising the steps of:
   (a) providing a smart-phone based credentialing platform having global positioning system (GPS) capability;
   (b) providing an electronic badge having a display having electronically controlled and changeable indicia thereon, the badge adapted communicate with a smart-phone;
   (c) enrolling a visitor into the credentialing platform by entering visitor information based on requirements of the administrator;
   (d) approving, by the administrator, that the requirements of the step of enrolling are met;

(e) requesting, by the visitor, at least one location for which access is desired and submitting the at least one location to the administrator via the credentialing platform, said location having a pre-defined area;

(f) approving, by the administrator, the request for access at the at least one location;

(g) checking in on the smart-phone, by the visitor, via the credentialing platform, to establish check-in data including check-in time and date by the visitor, wherein the check-in data is recorded by the credentialing platform;

(h) communicating between the smart-phone and the electronic badge, indicia data for forming a display image on the display on the electronic badge;

(i) displaying on the badge display indicia showing access by the visitor is authorized to the location during the specific time interval;

(j) recording, by the credentialing platform, geo-location data of the visitor during the visitor's presence in the pre-defined area;

(k) checking out of the system when the visitor departs the pre-defined area of the at least one location, establishing check-out data, including check-out time and date and geo-location;

(l) recording, by the credentialing platform, the check-in data, the geo-location data and the check-out data of the visitor; and (m) removing from the badge display, the indicia showing access by the visitor is authorized.

2. The method for credentialing visitors to an access-controlled environment of claim 1, including a step of requesting, by the visitor, a specific time interval for visiting the at least one location, and a step of approving, by the administrator, the request for the specific time interval, and wherein the step of checking in occurs during the specific time interval.

3. The method for credentialing visitors to an access-controlled environment of claim 1, including the step of providing an electronic identifier by the administrator to allow for access by the visitor to the at least one location at the specific time interval, and wherein the step of checking in on the smart-phone, by the visitor, includes using the electronic identifier via the credentialing platform during the specific time interval, to establish the check-in data.

4. The method for credentialing visitors to an access-controlled environment of claim 1, wherein the step of checking out of the system includes detecting when the visitor departs the pre-defined area utilizing the visitor's geo-location.

5. The method for credentialing visitors to an access-controlled environment of claim 1, wherein the step of checking out of the system includes manually checking out by the visitor on the smart-phone using the credentialing platform.

6. The method for credentialing visitors to an access-controlled environment of claim 1, wherein the step of enrolling a visitor into the credentialing platform by entering visitor information based on requirements of the administrator includes:

a) opening a smart phone application of the credentialing platform on the smart phone;

b) opening a credentialing platform account by selecting a visitor username and password or biometric; and c) providing personal information required by the credentialing platform into the account.

7. The method for credentialing visitors to an access-controlled environment of claim 6, wherein the step of enrolling a visitor into the credentialing platform by entering visitor information based on requirements of the administrator further includes:

a) executing documents; and b) uploading the executed documents to the credentialing platform.

8. The method for credentialing visitors to an access-controlled environment of claim 1, wherein the step of communicating between the smart-phone and the electronic badge includes communicating wirelessly.

9. The method for credentialing visitors to an access-controlled environment of claim 8, wherein the step of communicating between the smart-phone and the electronic badge includes communicating by near field communication (NFC).

10. The method for credentialing visitors to an access-controlled environment of claim 1, wherein the step of approving, by the administrator, that the requirements of the step of enrolling are met, and the step of approving, by the administrator, the request for access at the at least one location, includes confirmation by a human that the requirements of the step of enrolling are met.

11. The method for credentialing visitors to an access-controlled environment of claim 1, wherein the step of checking in by the visitor must occur within a specified distance from the at least one location.

12. The method for credentialing visitors to an access-controlled environment of claim 11, wherein the step of checking in must occur within a one mile radius from the at least one location.

13. The method for credentialing visitors to an access-controlled environment of claim 1, wherein the step of checking out of the system occurs automatically by the credentialing platform after a pre-determined time period set by the administrator.

14. The method for credentialing visitors to an access-controlled environment of claim 13, wherein the pre-determined time period is eight hours.

15. The method for credentialing visitors to an access-controlled environment of claim 1, wherein the step of requesting, by the visitor, at least one location for which access is desired is automatically denied by the credentialing platform upon the visitor reaching a predetermined number of visits to the at least one location.

16. The method for credentialing visitors to an access-controlled environment of claim 2, wherein the step of approving, by the administrator, the request for the specific time interval is automatically revoked upon reaching a predetermined amount of time after the step of requesting access by the visitor is made.

17. The method for credentialing visitors to an access-controlled environment of claim 1, wherein the step of approving, by the administrator, the request for access at the at least one location includes approval by a human on the staff of the administrator.

18. The method for credentialing visitors to an access-controlled environment of claim 1, wherein the step of approving, by the administrator, the request for access at the at least one location includes computerized approval without human contact.

19. The method for credentialing visitors to an access-controlled environment of claim 1, wherein the step of displaying on the badge display indicia showing access by the visitor is authorized includes displaying a machine readable code.

20. The method for credentialing visitors to an access-controlled environment of claim 1, wherein the electronic badge having a display utilizes a display using electronic paper display technology with low or no power requirements.

\* \* \* \* \*